US006307588B1

(12) United States Patent
Olson et al.

(10) Patent No.: US 6,307,588 B1
(45) Date of Patent: Oct. 23, 2001

(54) METHOD AND APPARATUS FOR ADDRESS EXPANSION IN A PARALLEL IMAGE PROCESSING MEMORY

(75) Inventors: Steven J. Olson, Portland; Robert C. Hinz, West Linn; Kurt M. Anderson, Molalla, all of OR (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/001,052

(22) Filed: Dec. 30, 1997

(51) Int. Cl.[7] .............................. H04N 5/76; H04N 5/228
(52) U.S. Cl. ..................... 348/222; 345/505; 345/547; 345/571; 348/232; 348/715; 382/304
(58) Field of Search ..................................... 348/207, 222, 348/231, 232, 233, 714, 715, 716, 717; 345/501, 502, 505, 506, 530, 531, 532, 536, 537, 545, 547, 564, 566, 570, 571–574; 382/302, 303, 304, 307; H04N 9/64, 5/76, 5/228

(56) References Cited

U.S. PATENT DOCUMENTS

| 4,208,721 | 6/1980 | Eisenberg . | |
|---|---|---|---|
| 4,493,105 | 1/1985 | Beall et al. . | |
| 4,674,861 | 6/1987 | Kawamura . | |
| 4,818,932 | * 4/1989 | Odenheimer | 345/134 |
| 4,850,028 | 7/1989 | Kawamura et al. . | |
| 4,860,375 | 8/1989 | McCubbrey et al. . | |
| 4,916,640 | 4/1990 | Gasperi et al. . | |
| 4,922,543 | 5/1990 | Ahlbom et al. . | |
| 4,967,392 | * 10/1990 | Werner | 345/505 |
| 5,115,309 | 5/1992 | Hang . | |
| 5,134,272 | 7/1992 | Tsuchiya et al. . | |
| 5,146,340 | 9/1992 | Dickerson et al. . | |
| 5,153,925 | 10/1992 | Tanioka et al. . | |
| 5,226,142 | * 7/1993 | Vegesna | 365/230.02 |
| 5,253,308 | 10/1993 | Johnson . | |
| 5,297,256 | 3/1994 | Wolstenholme et al. . | |
| 5,315,388 | 5/1994 | Shen et al. . | |
| 5,347,595 | 9/1994 | Bokser . | |
| 5,357,606 | * 10/1994 | Adams | 345/545 |
| 5,428,741 | * 6/1995 | Ho | 345/501 |
| 5,502,775 | 3/1996 | Takeo . | |
| 5,657,403 | 8/1997 | Wolff et al. . | |
| 5,758,043 | 5/1998 | Takizawa et al. . | |
| 5,982,395 | * 11/1999 | Olson | 345/572 |
| 6,008,850 | * 12/1999 | Sumihiro | 348/699 |
| 6,157,751 | * 12/2000 | Olson | 382/304 |

* cited by examiner

Primary Examiner—Wendy R. Garber
Assistant Examiner—Ngoc-Yen Vu
(74) Attorney, Agent, or Firm—William Loginov

(57) ABSTRACT

A method and apparatus for image processing provides a memory having a plurality of individual parallel buffers constructed from random access memories (RAMs) for storing data related to a group of image pixels. The buffers each store a parallel, identical version of the image data so that an image processor can access data related to a given pixel in the overall data from each buffer simultaneously. An address expander for the buffer rows and buffer columns is used to convert a row and column address of a selected "central" pixel into a plurality of related pixel data addresses offset at predetermined distances from the selected pixel data's address. In this manner, the address expanders enable a group of related pixels, each in a different parallel buffer, to be accessed simultaneously, without requiring the processor to be interconnected with all of the buffers. This substantially reduces the complexity of processor interconnection design, while substantially enhancing processor speed.

14 Claims, 5 Drawing Sheets

METHOD AND APPARATUS FOR ADDRESS EXPANSION IN A PARALLEL IMAGE PROCESSING MEMORY

FIELD OF THE INVENTION

This invention relates to the processing of image data stored in a plurality of parallel random access memories (RAMs) and more particularly to a method and apparatus for accessing multiple identical copies of the image data.

BACKGROUND OF THE INVENTION

In machine vision applications, it is common to acquire image data related to the surface of a workpiece and to store this data for further processing. Stored image data is used for pattern-recognition, error detection and other surface inspection applications. FIG. 1 details a basic image processing arrangement according to the prior art. A camera 30 having a lens 32 for acquiring an image and an electro-optical pickup device, such as a CCD array 34, transmits image data over a data line 36 to a memory device 38. The memory device in this example comprises a random access memory (RAM) configured to receive image data. Data is typically provided in digital form, often following conversion from an analog form by a analog to digital converter (not shown) located in the data path between the CCD array and the image RAM 38. Image data is stored in the image RAM 38 as individual pixels that each represent a given segment of the overall image. Each pixel represents a relatively small part of the total image, such that in aggregate, the image appears relatively continuous. Each pixel has a discrete intensity value that defines a brightness and, when applicable, a shade of color. Where the image is acquired and recorded in color, a pixel may be formed from at least three different-color sub-pixels that form the overall color shade. Alternatively, where the image is monochromatic, a numerical grayscale intensity value is recorded for the pixel. As described further below, the RAM is organized as a series of rows and columns, each individually addressed by an incoming data line. By addressing the appropriate row and column, all or part of a particular pixel intensity value can be accessed and read. An image processor 40 that can comprise any acceptable microprocessor or application specific integrated circuit (ASIC) retrieves intensity values as data over a multi-bit data line 42 based upon input pixel addresses transmitted over a multi-bit address line 44. Model or "template" image data, representative of an image to be compared to the acquired image, can be input to the processor through a variety of input lines denoted generally as the input line 48. The processor matches the model data to the acquired data stored in the RAM 38. The processor, using known techniques, calculates an overall match of the acquired data with the known data by combining the results of each individual pixel-by-pixel match performed by the processor. Results of matches made by the processor are output on an output line 50 to other processors or computers. These processors utilize the output data to perform more advanced operations such as overall pattern recognition.

The image processing arrangement of FIG. 1 enables pixel data to be accessed in the RAM in a largely serial manner. That is, only one pixel data can be read from the RAM to the processor in each addressing cycle. Some microprocessor arrangements such as the well-known Pentium® MMX® microprocessor available from Intel Corp. can access several pixel data simultaneously. For example the forenamed microprocessor uses a single address to access eight sequential eight-bit pixel data in one clock cycle. However, this arrangement has a limitation in that it requires all pixels data to be stored adjacent to each other in the RAM. Hence, to process a group of pixels widely spaced in two dimensions of an image, or at remote spacings from each other, the processor must address pixel data over several clock cycles. This slows the image processing procedure. Speed is a concern in a high-speed machine vision environment in which a large volume of data must be managed by the processing system continuously.

It is, therefore, an object of this invention to provide a more efficient method and apparatus for accessing multiple pixels in an image processing memory array.

SUMMARY OF THE INVENTION

This invention overcomes disadvantages of the prior art by providing parallel access by an image processor to a set of image memory devices each having a similar or identical set of image pixel data stored therein at similar or identical memory addresses without requiring the image processor to independently address each of the memory devices. In particular, a group of identical pixel data are stored at identical addresses in each of the memories. In other words, the same pixel data can be accessed in each memory by applying the same address to each memory. Given this interrelationship between memories, and the pixel data stored within each of the memories, an address expander structure uses a function governing the relationship between pixel data in a group of pixel data to convert a predetermined "central" pixel address into a plurality of interrelated pixel addresses from the group. The interrelated addresses allow the processor to generate one address and, in turn, address several different pixel data in the group simultaneously—one pixel data from each of the plurality of memories. These pixel data are all provided to the processor at once. This method and apparatus enables fewer interconnections with memory components since the number of address lines needed by the processor is reduced.

In a preferred embodiment, one or more address expanders are employed to access memory locations in each of the memory devices that each contain a particular pixel data related to a selected "central" pixel data specifically addressed by the processor. As such, the addressing of a central pixel by the processor results in the addressing by the address expanders of a plurality of interrelated pixels each stored in different memory devices. Each interrelated pixel is therefore accessed concurrently by the processor. The address expanders use predetermined functions to generate a plurality of addresses offset from the central pixel address. Each of the plurality of offset addresses are transmitted by a dedicated address line from the expanders to a respective memory device. The processor moves through the image data selecting successive central pixels until all desired image data is addressed and successive offset addresses have been produced by the address expanders.

In a preferred embodiment the memory devices comprise a plurality of buffers each constructed from one or more RAMs organized as a series of addressable rows and columns. The address expanders comprise a row address expander that receives a row address of a central pixel from the processor and a column address expander that receives a column address of the central pixel from the processor. The row address expander and column address expander each generate several offset row and column addresses by performing a predetermined function to the input row and input column address of the central pixel.

In one embodiment, the predetermined function is the addition or subtraction of offset constants in order to access pixels that are directly adjacent to the central pixel within the overall image. Other functions, such as logarithmic or multiplicative functions can be employed by the address expanders to generate offset addresses in an alternate embodiment. The address expanders can comprise ASICs or field programmable gate arrays (FPGAs) that enable constants and/or functions to be entered into the expanders on an ongoing basis by a downstream data processor. The constants and/or functions can be varied based upon specific image processing requirements or based upon the nature of the central pixel (e.g. location of the central pixel in the overall image, its relative intensity, its color shade, etc.). In one embodiment the memory array includes twelve buffers each constructed of two 512 K-byte RAMs arranged in a ten-bit-by-ten-bit row and column address arrangement. The address expanders generate three rows and four columns to access a three-by-four matrix of buffers.

BRIEF DESCRIPTION OF THE DRAWINGS

The foregoing and other objects and advantages of the invention will become more clear with reference to the following detailed description as illustrated by the drawings in which.

DETAILED DESCRIPTION

Figure 1:
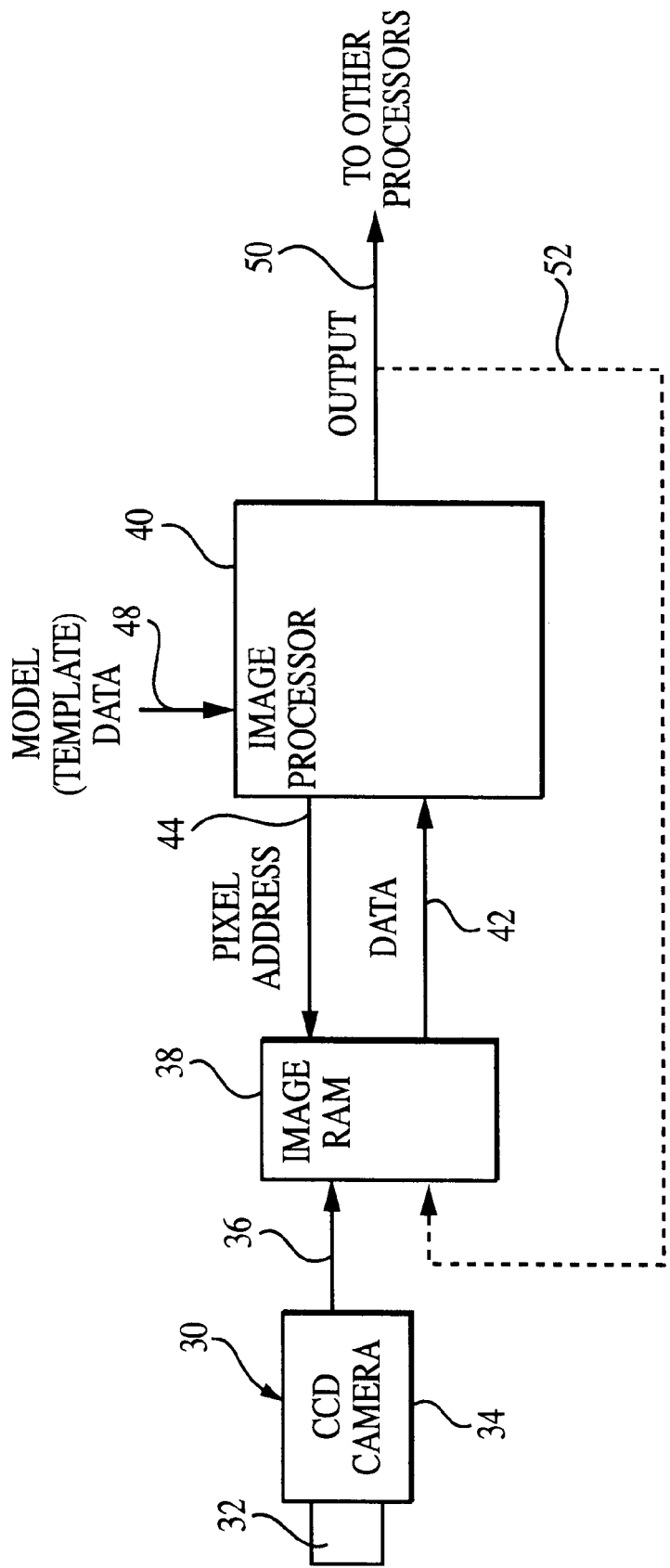
FIG. 1, previously described, is a block diagram of an image processing system according to the prior art.
Figure 2:
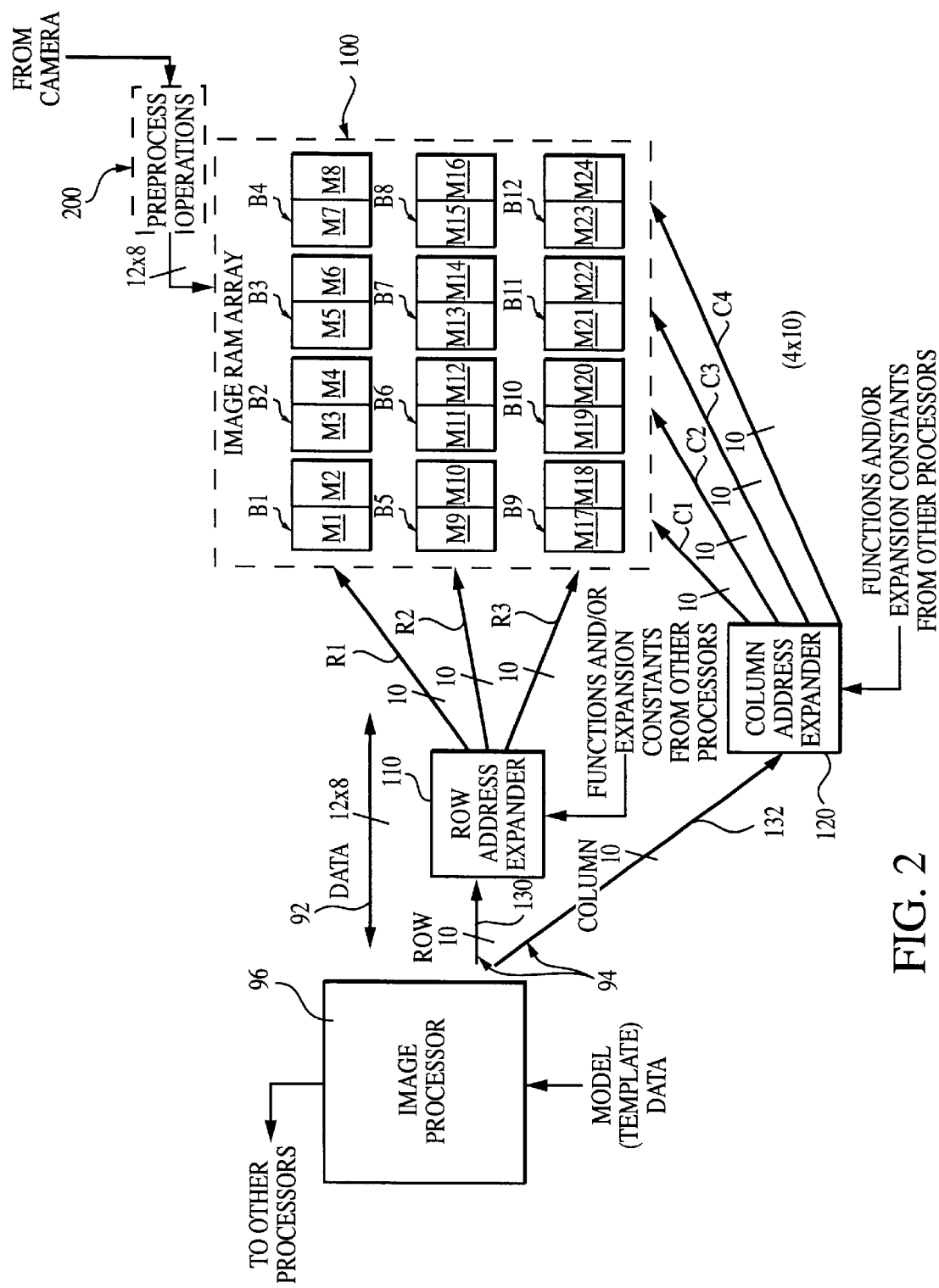
FIG. 2 is a block diagram detailing an improved image processing system having row and column RAM address expanders according to this invention.

FIG. 2 shows an image processing system according to a preferred embodiment of this invention. The system receives image data in digital form from a CCD or other electro-optical camera as described above and outputs processed data to another downstream processing and/or display system for further processing and manipulation. Model data can be provided to the system (connected to, for example, the processor 96) for template matching, or the processor can reroute processed data back to the memory, as described above for FIG. 1. The image processing system according to this invention receives image signals from a camera, such as the CCD camera, as shown in FIG. 1. Likewise, the system of this invention outputs processed data to other processors, and is controlled based upon control and data signals of other processors, as shown in FIG. 1.

In this embodiment, a large memory array 100 of individual random access memories (RAMs) is employed to provide parallel access to a group of image pixels. This array enables all pixels in a chosen group to be accessed simultaneously, within the same address cycle for substantially increased processing speed. The RAMs are conventional, and are arranged as twelve pairs B1, B2–B12 of discrete RAMs M1 and M2, M3 and M4 to M23 and M24, respectively. Each pair of RAMs forms an independent image "buffer" comprising two separate 512 K-byte RAM devices in this example. Each buffer allows storage of an identical copy of the same set of image data from the camera. Overall, twenty-four RAM devices M1–M24 are employed in the array 100 so as to define three horizontal array "rows" each having four buffers. The buffers define four vertical array "columns" of three buffers, each. Although not shown in detail, each individual buffer consists of an individual array of well-known, conventional storage rows and columns that define the addresses of discrete storage cells each for storing an image pixel data. Each cell is accessed to read data from or write data to the cell by applying the particular row and column address over the row and column address lines that extend from the image processor 94. These row and column address lines are shown in aggregate as the twelve twenty-bit address line grouping 94 that extend from dedicated I/O ports on the image processor 94. Typically, each twenty-bit address line comprises a separate ten-bit row and ten-bit column address line 130 and 132, respectively.

Typically, the two discrete RAMs of each buffer B1–B12 comprise the high and low memory locations of a total memory space of over one megabyte. As described, the address for each buffer B1–B12 is twenty bits wide in which the high bit acts as a chip select function between each of the two RAMs in the buffer pair. Thus, the row and column addresses only access one cell of the overall buffer in each address cycle. According to this embodiment, the processor 96 comprises a custom ASIC or field programmable gate array (FPGA), can simultaneously access twelve different (generally non-contiguous) pixels from the same image by addressing a different pixel in each of the twelve buffers B1–B12.

Data is transferred between the processor 96 and the RAM array 80 over the multi-bit data line 92 that comprises twelve individual eight-bit data lines each linked with a separate buffer. The number of bits in each data line depends largely upon the size of each pixel value. This number can vary. To access locations in each buffer for read and write operations over the data lines 92, the processor 96 transfers address values to each of the twelve buffers over the address lines 94. As noted, the addresses are twenty bits wide in this example. If all buffers are independently connected to the processor 96, then three hundred thirty-six or more data and address lines are required. In many circumstances, however, fewer interconnections can be employed by taking into account the fact that the grouping of pixels to be sampled usually contains pixels that are adjacent to each other or otherwise related according to a predictable set of parameters.

Since image processing according to this embodiment is basically a "local" operation, not directly involving the intervention of a main computer (typically located downstream in the data path) or its operating system, then the organization of input/output space (e.g. "I/O count") in the main computer is not a significant concern. Therefore, the local addressing can be employed. A pair of address expanders 110 and 120 are provided along the row and column address lines 130 and 132 respectively between the image processor 96 and the RAM array 100. In this embodiment, a row address expander 110, connected to the row address line 130, is used to access each of the three rows of buffers B1–B4, B5–B8 or B9–B12 in the three-by-four (row versus column) buffer array 100. Likewise, a column address expander 120, connected to the column address line 132, is used to access each of the four columns of buffers (B1, B5, B9), (B2, B6, B10), (B3, B7, B11) or (B4, B8, B12) in the buffer array 100.

Figure 3:
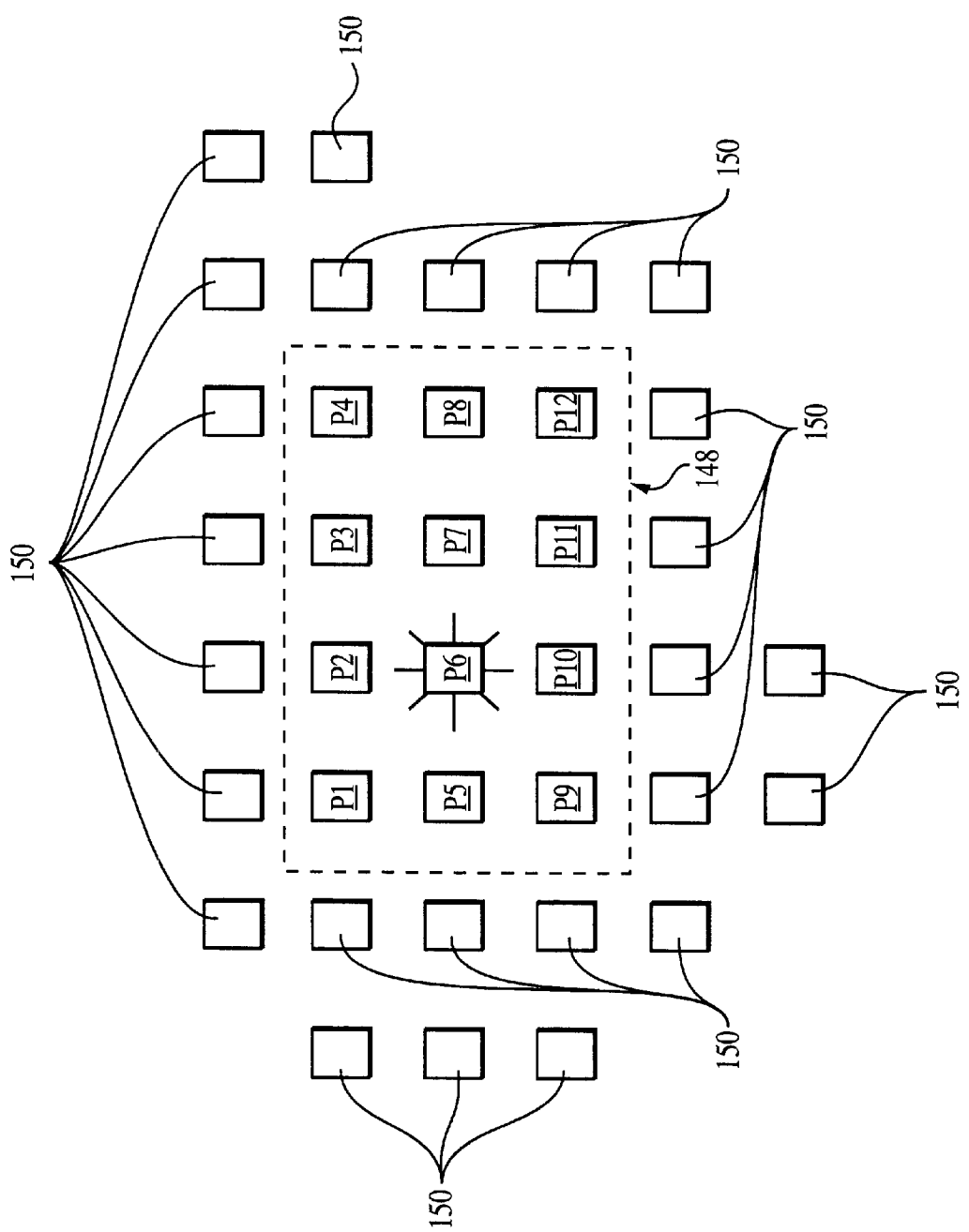
FIG. 3 is an exemplary grouping of adjacent pixels to be processed according to an embodiment of this invention.

The row and column address expanders 110 and 120 can be implemented as an FPGA or ASIC according to this embodiment. This is detailed further below. In a typical image processing arrangement, it is not necessary to independently address each image buffer without reference to the other buffers. Conversely, the processor addresses a "central" pixel, and further addresses pixels adjacent (or otherwise-related) to the central pixel. These adjacent or related pixels are each located at a predetermined offset from the central pixel. FIG. 3 depicts a portion of an image defined by individual pixels 150. A typical grouping 148 of adjacent pixels has been selected to be processed within a larger field of pixels 150. As noted previously, each pixel is defined by an intensity value (and/or, where applicable, a color shade) that is expressed as a digital data value at an appropriate address in the each of the parallel buffers B1–B12. The grouping 148 comprises twelve adjacent pixels in this embodiment denoted P1–P12. P6 is denoted as the central pixel for the purposes of this example. Twelve pixels are grouped so that each pixel P1–P12 can be concurrently addressed in one of the twelve buffers B1–B12. It is expressly contemplated that the number and arrangement of grouped pixels can be varied. In addition, pixels need not be adjacent. It is desired only that a selectable offset be chosen from one or more central pixels that produces useful data when the pixels are processed. For the purposes of this example it is assumed that the processor addresses pixel P1 in buffer B1, P2 in B2, P3 in B3, etc.

To use the address expanders 110 and 120, the processor 96 first generates the central pixel's (P6) RAM address (see also FIG. 2). This is the same address in each of the buffers, or it can differ from buffer to buffer as long as the difference is known to the processor. The processor provides ten bits of row address to the row address expander 110 and ten bits of column address to the column address expander 120. The total of twenty bits (row and column of RAM) is then converted by the row address expander into three discrete ten-bit row address signals R1, R2 and R3 that each have a fixed address offset relative to the other. A fixed positive or negative offset value is provided by the row address expander 110 to the central pixel row. R2 can be at zero offset, since for the purposes of this example, R2 is assumed to contain the central pixel's (P6) row address. Similarly, the column address expander 120 provides a fixed positive or negative offset to the central pixel's column address to produce the discrete ten-bit column address signals C1, C2, C3 and C4. Again, for the purposes of this example, the offset of C2 is assumed to be zero since this is the central pixel's column address.

Without address expanders, address generation would require at least two hundred forty individual I/O connections between the processor and RAM array. With address expanders, the processor requires only twenty I/O locations (e.g. pins) for addressing the memory, these connections being made with the address expanders 110 and 120.

Figure 4:
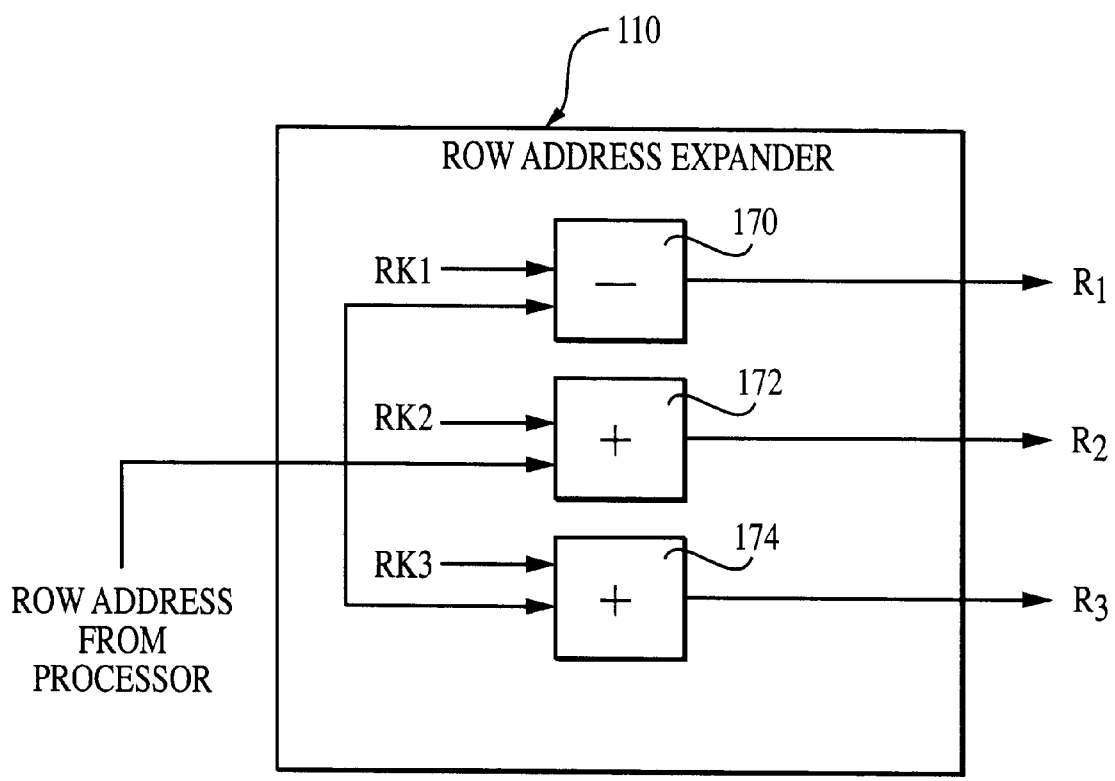
FIG. 4 is a somewhat schematic diagram depicting generalized operation of a row address expander according to the embodiment of FIG. 2.
Figure 5:
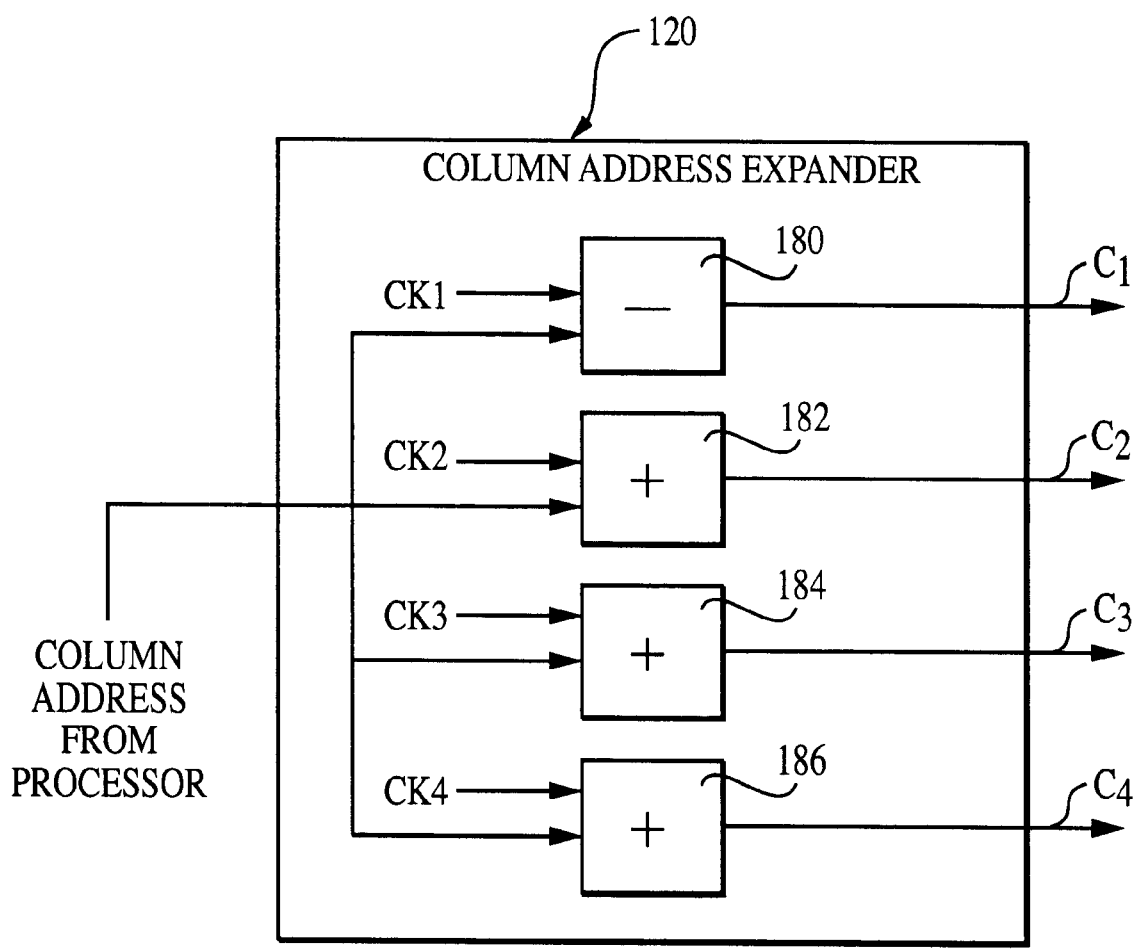
FIG. 5 is a somewhat schematic diagram depicting generalized operation of a column address expander according to the embodiment of FIG. 2.

FIGS. 4 and 5 respectively detail the row and column address expanders 110 and 120 further. With reference to FIG. 4, the multi-bit row address from the processor 96 (see FIG. 2) is input. The processor's row address value (ten bits) is routed to a converter structure comprising three arithmetic units (adders and/or subtractors) 170, 172 and 174 that perform the simple addition and/or subtraction of the ten-bit input row address value by a set of constants RK1, RK2 and RK3, respectively. As noted, RK2 equals zero address offset in this example. RK1 and RK3 are equal to address offset values that respectively addresses the preceding row and succeeding row to the central pixel row in each RAM. This value is the number necessary to address the previous row (e.g. RK1=−1). RK1 and RK2 are typically equal in magnitude and opposite in sign where all adders perform addition. Alternatively RK1 can be equal to RK3 where the first arithmetic unit 170 is a subtractor and the last arithmetic unit 174 is an adder.

FIG. 5, similarly, details the column address expander 120 further. A column address value for the central pixel is input to a set of four arithmetic units 180, 182, 184 and 186. These units combine the input column address with respective constants CK1, CK2, CK3 and CK4. Like the row address expander 120, the column address expander subtracts the magnitude of CK1 from the first address. Either a subtractor is used to subtract a positive constant value or a negative constant value is added to the address. CK2 is typically equal to zero offset, since the address output (C2) by the column expander 120 is the central pixel's column address. CK3 typically equals CK1 in magnitude and is positive. Finally, CK4, which produces offset address output C4 is two times CK3 in this embodiment (where a ten-by-ten symmetrical matrix of rows and columns is used for the RAM). The system processors can provide adjustments to certain constants when central pixels at the "edges" of an image field are addressed. Since the closest pixels in the RAM address space may be on the other side of the actual image, it may not be desirable to process these pixels as "adjacent" pixels. The same procedures that are used in the prior art to limit the addressing of pixels at the edge of the image can be adapted to recognize pixels at the edge of the field and to limit addressing of pixels outside of the image "edge."

As the processor works through the stored image data, it continuously addresses new central pixels. The row and column expanders operate to provide a continually changing three-by-four grouping around the current central pixel. It is expressly contemplated that the size of the grouping can be changed. More or fewer arithmetic units can be provided to each of the address expanders to accommodate differently sized and configured (e.g. four-by-four, four-by-five, etc.) groupings. Likewise, the spacing between adjacent pixels can be varied. Referring to FIG. 2, each address expander 110 and 120 is loaded with constants from a downstream processor (such as an overall control computer-not shown). The constants can be derived by any type of function. Hence the offset can be taken as an exponent of the central pixel or a logarithmic function thereof. Pixel offsets that conform to the function can be input. The input offset can be changed depending upon the location and/or value of the central pixel. For example, if a pixel has a high intensity, the offset values loaded into the expanders may be increased, or vice versa. As used herein the term "predetermined function" shall be used to describe the mathematical derivation of offset constants for input to the address expanders. The predetermined function can comprise any mathematical function that generates offset address values from a central pixel address value. The use of an FPGA for the address expanders facilitates the loading of variable constants.

Additionally, while the functions on the expanders comprise adders/subtractors that simply add or subtract constants derived at another location, it is contemplated that the predetermined functions, themselves can be loaded onto the FPGA by system processors. As such, the adder functions shown and described can be replaced with multiplier functions or logarithmic functions as needed. These functions could include inherent constants for performing mathematical operations. The "predetermined function," therefore, can be accomplished by the address expanders to directly generate offset address values from a central pixel address value or the "predetermined function" can be accomplished remote from the address expanders and be used to generate constants that are added or subtracted from the central pixel address value.

Finally, while the image data acquired by the camera is loaded into each of the separate buffers according to this invention so that the pixel data can be accessed in parallel, the data in each buffer need not be identical in the absolute sense. FIG. 2 shows an optional block for preprocess operations 200 located between the memory array and the camera on the twelve-by-eight data line. Each buffer can, in fact, be loaded with a somewhat different preprocessed group of image pixel data. For example, buffer B1 can receive data that is smoothed by a Gaussian or other function, while buffer B2 can receive data smoothed by a different function, or not at all. The data in each buffer is therefore a "version" of the image data originally acquired by the camera. The pixels may be located at the same address locations or near these locations, but their actual data values may vary depending upon the form of preprocess operation applied to each buffer input. Likewise, the processor can be arranged to account for differences in data entering from different buffers. For example, data entering the processor from B1 can be used for vertical edge detection while data entering from B2 can be used for horizontal edge detection. Such a variable use of stored data is expressly contemplated.

The foregoing has been a detailed description of a preferred embodiment of the invention. Various modifications and additions can be made without departing from the spirit and scope of this invention. For example a plurality of central pixels can be chosen for performing different addressing functions. A first central pixel can be chosen for column expansion and a second, different, central pixel can be chosen for row expansion. Data from a plurality of cameras can be provided to the array, and, as stated, different is versions of the data can be loaded from the camera(s) into the different buffers of the memory array. Accordingly, this description is meant to be taken only by way of example and not to otherwise limit the scope of the invention.

What is claimed is:

1. A system for processing a group of image pixel data comprising:

a plurality of random access memories, each of the memories having addresses that are arranged identically to each other, each of the random access memories storing the group of image pixel data at the identical addresses, wherein each of the addresses is constructed and arranged to store an image pixel data of the group of image pixel data;

an image processor that generates address values for accessing the group of image pixel data over a multi-bit address line and that manipulates the group of image pixel data;

an address expander interconnected with the multi-bit address line, the address expander being constructed and arranged to convert a selected address in each of the memories into a plurality of related addresses in each of the memories, related image pixel data from the group of image pixel data being stored at the plurality of related addresses, a selected image pixel data from the group of image pixel data being stored at the selected address, and each of the related addresses being located at a predetermined offset relative to the selected address; and a plurality of address expander address lines that transmit the plurality of related addresses to each of the plurality of random access memories so that the processor accesses each of the plurality of related image pixel data over the multi-bit data line.

2. The system as set forth in claim 1 wherein the address expander includes a row address expander for receiving a selected row address in each of the random access memories of the selected image pixel data and for converting the selected row address into a plurality of related row addresses at predetermined offset row address locations and wherein the plurality of address expander lines include a plurality of row address expander lines interconnected with row addresses in each of the plurality of random access memories.

3. The system as set forth in claim 1 wherein the address expander includes a column address expander for receiving a selected column address in each of the random access memories of the selected image pixel data and for converting the selected column address into a plurality of related column addresses at predetermined offset column address locations and wherein the plurality of address expander lines include a plurality of column address expander lines interconnected with column addresses in each of the plurality of random access memories.

4. The system as set forth in claim 3 wherein each of the row address expander and the column address expander includes a converter structure for performing a predetermined function on the respective selected row address and selected column address to thereby derive the plurality of row addresses at the predetermined offset row address locations and plurality of column addresses at the predetermined offset column address locations.

5. The system as set forth in claim 4 wherein the converter structure of each of the row address expander and column address expander comprises a field programmable gate array that receives a configuration for performing the predetermined function from a remote location.

6. The system as set forth in claim 4 wherein the converter structure of each of the row address expander and the column address expander comprises means for adding a plurality of row offset constants and the means for adding the plurality of column offset constants to the selected row address and column address respectively.

7. The system as set forth in claim 6 wherein the means for adding the plurality of row offset constants and the means for adding the plurality of column offset constants are each constructed and arranged to receive respective row offset constants and columns offset constants at predetermined times from a remote location.

8. The system as set forth in claim 4 wherein each of the row address expander and column address expander are constructed and arranged to receive the selected row address being ten bits wide and the selected column address being ten bits wide respectively, and to derive the plurality of related row addresses each being ten bits wide and the plurality of related column addresses each being ten bits wide respectively.

9. The system as set forth in claim 8 wherein the plurality of related row addresses and the plurality of related column addresses correspond to related image pixel data for related image pixels in an image directly adjacent to a selected image pixel in the image, the selected image pixel corresponding to the selected image pixel data.

10. The system as set forth in claim 9 wherein the related image pixels and the selected image pixel together define a grid of image pixels being three image pixels-by-four image pixels in size.

11. A method for processing a group of image pixel data comprising:

establishing a plurality of random access memories, each of the memories having addresses that are arranged identically to each other, the step of establishing including storing in each of the random access memories the group of image pixel data at the addresses, wherein an image pixel data of the group of image pixel data is stored in each of the addresses of each of the random access memories;

generating, with an image processor, address values for accessing the group of image pixel data over a multi-bit address line and manipulating the group of image pixel data transferred between the image processor and the random access memories over a multi-bit data line;

providing an address expander interconnected with the multi-bit address line, the step of providing including converting, with the address expander, a selected address in each of the memories, a selected image pixel data from the group of image pixel data being stored at the selected address, into a plurality of related addresses in each of the memories, related image pixel data from the group of image pixel data being stored at the plurality of related addresses, and each of the related addressed being located at a predetermined offset relative to the selected address; and transmitting, over a plurality of address expander address lines, the plurality of related addresses to each of the plurality of random access memories so that the processor accesses each of the plurality of related image pixel data over the multi-bit data line.

12. The method as set forth in claim 11 wherein the selected address includes a selected row address and a selected column address and wherein the step of converting includes performing a conversion function that converts the selected row address into a plurality of related row addresses and that converts the selected column address into a plurality of related column addresses in each of the random access memories.

13. The method as set forth in claim 12 wherein the step of performing the conversion function includes adding offset constants to the selected row address, the offset constants including a value that shifts the selected row address by at least one row address.

14. The method as set forth in claim 13 wherein the step of performing the conversion function includes adding offset constants to the selected column address, the offset constants including a value that shifts the selected column address by at least one column address.

* * * * *